United States Patent [19]
Li

[11] Patent Number: 5,857,261
[45] Date of Patent: Jan. 12, 1999

[54] SOPHISTICATED STRUCTURE FOR A TAPE MEASURE

[76] Inventor: Shih Lin Li, No. 22, Lane 81, Sec. 2, Tunha S. Rd., Taipei, Taiwan

[21] Appl. No.: 962,301

[22] Filed: Oct. 31, 1997

[51] Int. Cl.$^6$ .................................................. G01B 3/10
[52] U.S. Cl. .............................. 33/767; 33/755; 242/385
[58] Field of Search ........................... 33/755, 761, 767, 33/769, 756, 759, 764; 242/385.3, 385, 385.2, 385.4

[56] References Cited

U.S. PATENT DOCUMENTS

| | | | |
|---|---|---|---|
| 1,737,323 | 11/1929 | Mursu | 242/385.3 |
| 2,510,939 | 6/1950 | Carlson | 33/767 |
| 4,756,087 | 7/1988 | Sing | 33/761 |
| 5,400,520 | 3/1995 | Hillinger | 33/761 |
| 5,471,761 | 12/1995 | Cheng | 33/761 |

FOREIGN PATENT DOCUMENTS

| | | | |
|---|---|---|---|
| 1331531 | 5/1963 | France | 33/767 |
| 945389 | 12/1963 | United Kingdom | 33/767 |

*Primary Examiner*—Christopher W. Fulton
*Assistant Examiner*—Andrew Hirshfeld
*Attorney, Agent, or Firm*—Dougherty & Troxell

[57] ABSTRACT

A sophisticated structure for a tape measure is disclosed having a measuring tape, a main body, and a brake apparatus, the brake apparatus including a plurality of acute teeth, a brake lever and two positioning pins. A user may pull out the tape with an estimated shortest measuring length which assures him of being free from the fear that the tape might wind up abruptly causing injury to the user. The tape measure also can be used to successively measure different lengths by increasing the tape length from the shortest to the longest. When winding up the tape, the user may further pull out a short section of the tape by hand, then tilt the main body in an axial direction to a certain angle and release the tape to perform the withdrawal operation.

2 Claims, 4 Drawing Sheets

SOPHISTICATED STRUCTURE FOR A TAPE MEASURE

BACKGROUND OF THE INVENTION

1. Field of the Invention

The present invention relates to a sophisticated structure for a tape measure, and more particularly, to a tape measure whose withdrawal may be performed easily without forcibly operating a brake key as in a conventional tape measure.

2. Description of the Prior Art

The tape measure is frequently used in a construction site for professional measurement, estimation and examination. It is also necessary for domestic application such as house repairing or furniture making done by the owner in an amateur do-it-yourself way. The common disadvantageous shortcomings of conventional tape measures are that they are either too large in size or too hard to handle. Consequently it is although a minor, yet important matter to develop a tape measure with a structure which can be securely, easily and conveniently handled. The practical disadvantageous shortcomings of known tape measures are:

1. The pulled out measuring tape will automatically retract with a strong bouncing action if it is not properly controlled, which in the worst case, results in injury to the user himself or to a third person nearby.
2. The failure rate is high in spite of their simple construction. This is caused by frequent on-off operation of the control key to hold or release the measuring tape. Consequently the lifetime of the conventional tape measures is not as long as expected by users.
3. It is hard to operate when several measurements are required. As the shortcoming described in item 1, it is difficult to halt the tape measure at the desired length for measurement resulting in repeated extending or rewinding of the measuring tape.
4. A bulky structure with an inconvenient operational mechanism makes the conventional tape measures not only unable to be handled by skilled technicians, but also dangerous for amateurs to handle them in do-it-yourself work for fear of hurting users due to careless handling.

Accordingly, there is an urgent need for developing a new structure for a tape measure which is simply constructed, and securely and conveniently useable.

SUMMARY OF THE INVENTION

It is a first object of the present invention to provide a sophisticated structure for a tape measure which looks clean and neat in its appearance with a simple operative structure.

To achieve this object, the present invention provides a sophisticated but simple structure for a tape measure in which a control key, as is usually equipped in a conventional tape measure, provides better usability. The tape measure with the structure according to the present invention can be used for several measurements in one time conveniently, by pulling out the shortest estimated length among those several lengths to be measured, and increasing its length to the longest one to be measured. The particular structure provided by the invention is that when winding the measuring tape, the user may further pull out a short section of the measuring tape by hand, then immediately afterwards tilt the main body in its axial direction to a certain angle thereby releasing the measuring tape to perform the withdrawal operation.

It is a second object of the present invention to provide the structure for a measuring tape which is securely useable with low failure rate and good durability.

To achieve this object, the present invention provides a sophisticated structure for a tape measure which is securely protected from sudden automatic winding back of the measuring tape after being extended that may cause unexpected injury to the user or a nearby third person is prevented, and it is secure enough for a child to handle. A control key provided for the conventional tape measure is generally apt to slip and is hard to fix the measuring tape. Moreover, it cannot bear frequent use, and it will get stuck when the tape measure has been left unused for a long time. The structure of the present invention is free from such troublesome mechanisms.

BRIEF DESCRIPTION OF DRAWINGS

The invention, as well as its many advantages, may be further understood by the following detailed description and drawings in which.

| Illustration for Numeral Expressions: | |
|---|---|
| 1: main body of a tape measure | 21: Tape reel |
| 10: upper cover | 22: depressed groove |
| 11: base frame | 3: brake lever |
| 12: pivot axis | 31: positioning pin |
| 2: measuring tape | 32: acute tooth |

DETAILED DESCRIPTION OF THE PREFERRED EMBODIMENT

Figure 1:
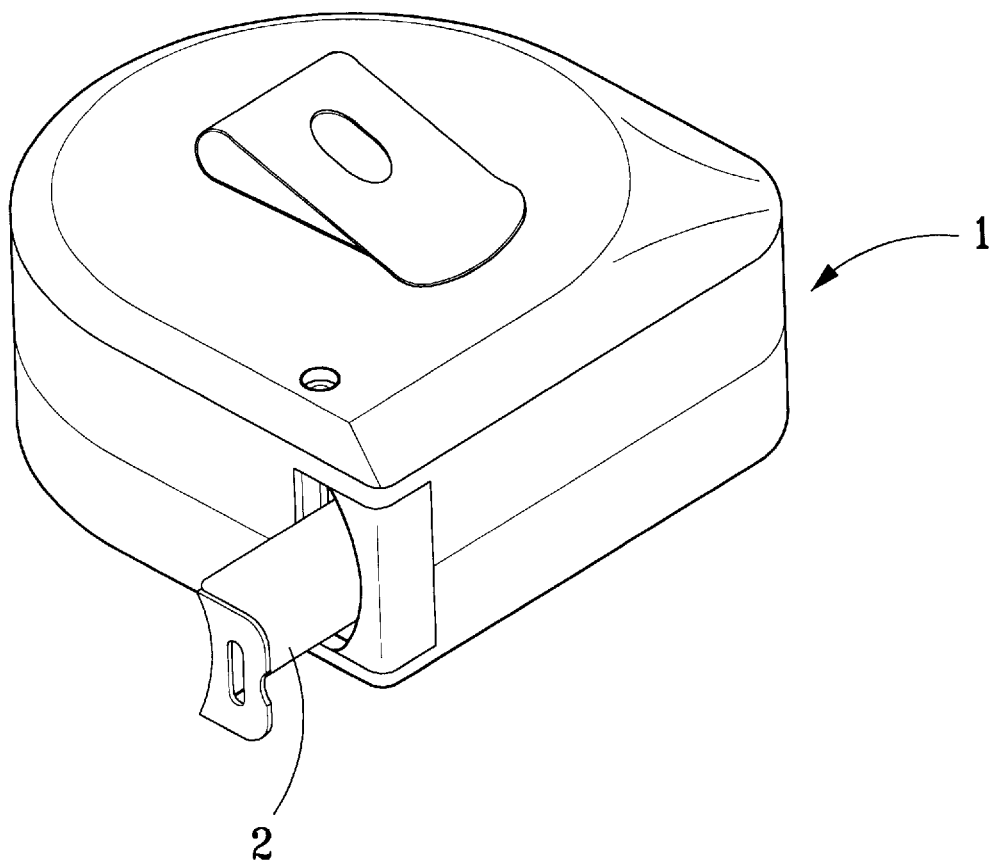
FIG. 1 is an assembly drawing of the tape measure according to the present invention.
Figure 2:
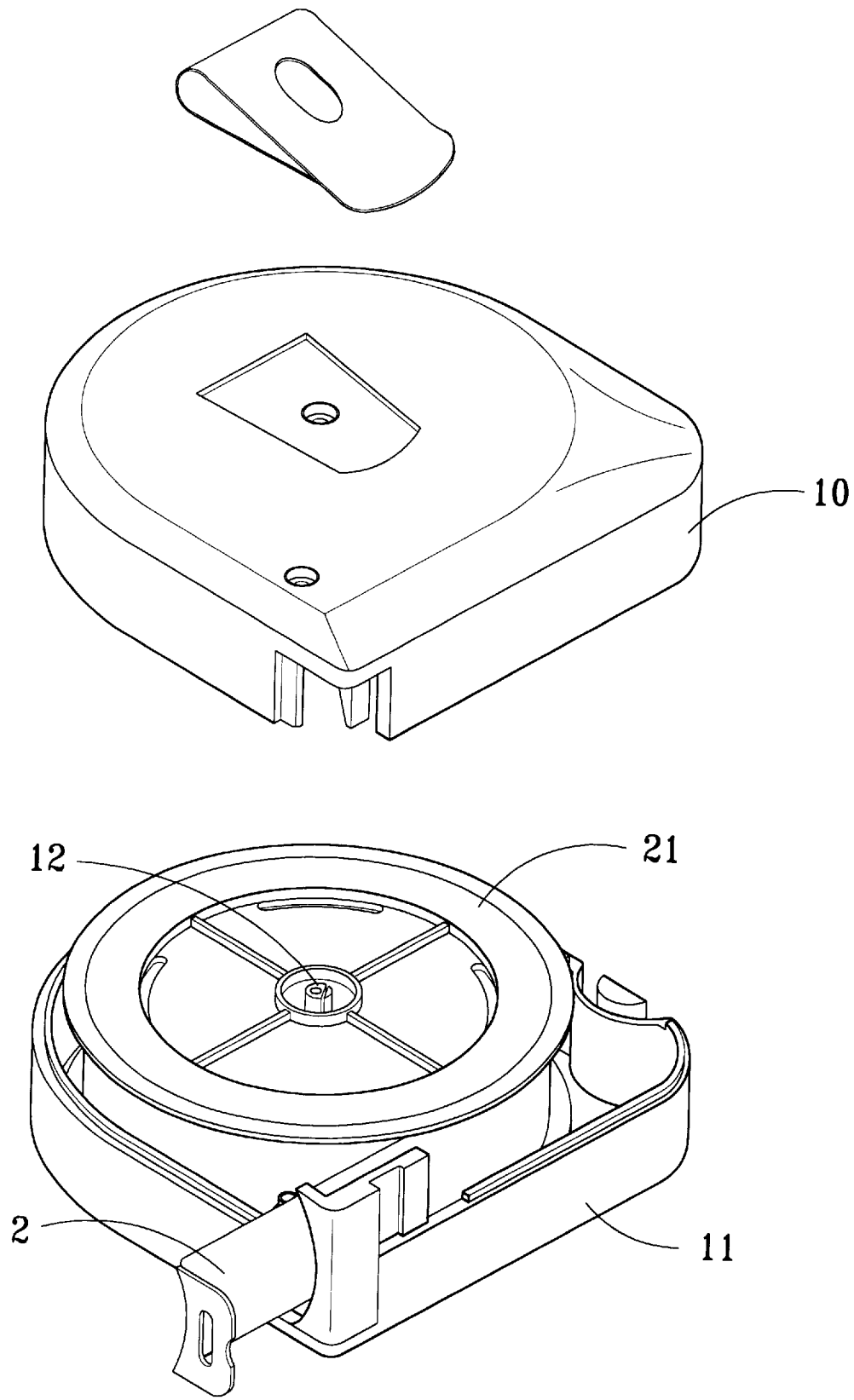
FIG. 2 is an exploded drawing of the tape measure according to the present invention.
Figure 3:
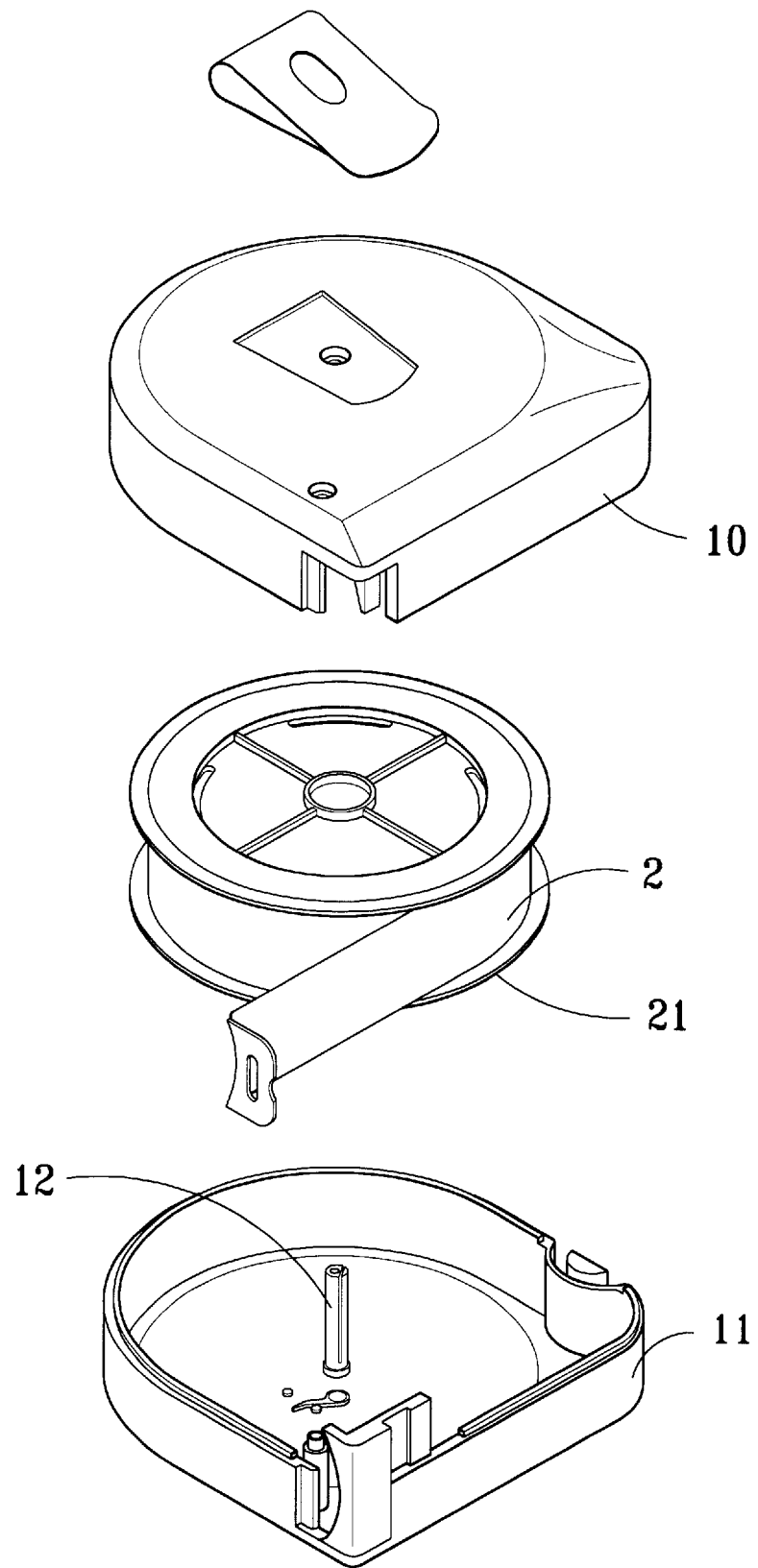
FIG. 3 is another exploded drawing of the tape measure according to the present invention.

Referring to FIGS. 1 to 3, showing the assembly and exploded drawings of the tape measure according to the present invention which comprises: a measuring tape 2; a tape reel 21 for winding the measuring tape 2 around it, with a depressed groove 22 provided around thereunder. There are a plurality of acute teeth 32 disposed along the inner wall of the circumference of the depressed groove 22 forming in into a toothed wheel. Further, a spring (not shown) is provided in the tape reel 21 for winding up the measuring tape 2; a main body 1 including an upper cover 10 and a base frame 11 with a pivot axis 12 standing at the center of the base frame 11 for fixing and connecting the tape reel 21 and the upper cover 10; and a brake apparatus in direct control of the rotation of the tape reel 21.

Figure 4:
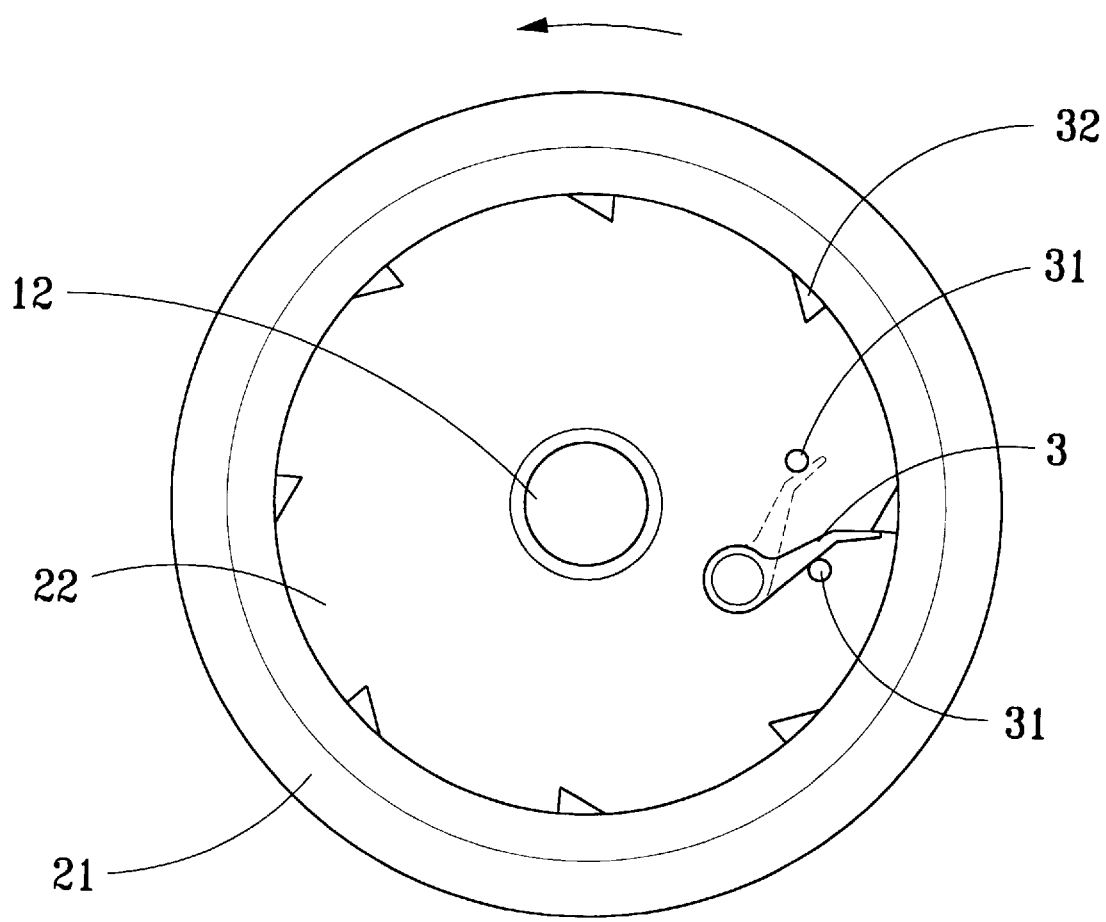
FIG. 4 is an illustrative drawing showing operation of the brake apparatus according to the present invention.

Referring to FIGS. 3 and 4 showing the exploded drawings of the tape measure and the operation of its brake apparatus according to the present invention respectively. The brake apparatus includes a brake lever 3 and two positioning pins 31 all installed inside the base frame. The brake lever 3 is located between two positioning pins 31.

As the measuring tape 2 is pulled out, the tape reel 21 rotates in the counter clockwise-direction in the direction of the arrow in FIG. 4, causing the brake lever 3 to bounce upward by slipping along the sloped surface of one of the acute teeth 32 allowing the measuring tape 2 to be pulled out. As the control is released, the tape reel 21 on way of returning to its initial position by rotating in the clockwise direction (as viewed in FIG. 4) by the spring restoring force, is halted by the brake lever 3 moving against the sloped direction of the acute tooth 32 and stops at the lower positioning pin 31 to cease the winding of the measuring tape 2.

If the measuring tape 2 is to be wound up, the user may further pull out an additional short length of the tape 2 and hold it, then tilt the main body 1 with a certain angle in its axial direction and release the tape 2, at this moment, being freed from the restraint of the acute tooth 32, the brake lever 3 stays at the upper positioning pins 31 so that the measuring tape may be wound back entirely into the main body 1.

Accordingly, the sophisticated structure for a tape measure according to the present invention can provide a tape measure having a simple structure without the need of a control key, but with a better usability, security, durability and low failure rate.

Many changes and modifications in the above described embodiment of the invention can, be carried out without departing from the scope thereof. Accordingly, to promote the progress in science and the useful arts, the invention is disclosed and is intended to be limited only by the scope of the appended claims.

What is claimed is:

1. A tape measure having a measuring tape and comprising:

a) a main body including an upper cover attached to a base frame, the base frame having a pivot axis thereon;

b) a tape reel having the measuring tape wound around a periphery of the tape reel, the tape reel having two opposite sides with a depressed groove formed in one of the two opposite sides, and a plurality of acute teeth extending from a wall bounding the depressed groove, the tape reel rotatably located on the pivot axis of the base frame such that it winds up the measuring tape on the tape reel; and, c) a brake apparatus having a brake lever pivotally connected to the base frame and movable between a first position wherein the brake lever engages one of the plurality of acute teeth so as to prevent rotation of the tape reel in a measuring tape wind up direction, and a second position wherein the brake lever is disengaged from the plurality of acute teeth, wherein the brake lever is attached to the base frame so as to be freely pivotable between the first and second positions wherein tilting the main body in a predetermined direction causes the brake level to move between the first and second positions.

2. The tape measure of claim 1 further comprising first and second positioning pins extending from the base frame located such that one of the positioning pins contacts the brake lever in each of the first and second positions.

* * * * *